United States Patent
Leshem Gat et al.

(10) Patent No.: US 12,495,119 B2
(45) Date of Patent: Dec. 9, 2025

(54) SYSTEM AND METHOD FOR CREATING BACKGROUND BLUR IN CAMERA PANNING OR MOTION

(71) Applicant: Corephotonics Ltd., Tel Aviv (IL)

(72) Inventors: Anat Leshem Gat, Tel Aviv (IL); Ruthy Katz, Tel Aviv (IL); Omri Levi, Tel Aviv (IL); Oded Gigushinski, Tel Aviv (IL); Yiftah Kowal, Tel Aviv (IL); Ephraim Goldenberg, Tel Aviv (IL); Gal Shabtay, Tel Aviv (IL); Noy Cohen, Tel Aviv (IL); Michael Scherer, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/951,730

(22) Filed: Nov. 19, 2024

(65) Prior Publication Data
US 2025/0080686 A1      Mar. 6, 2025

Related U.S. Application Data

(63) Continuation of application No. 17/739,093, filed on May 7, 2022, now Pat. No. 12,177,596, which is a
(Continued)

(51) Int. Cl.
*H04N 5/262* (2006.01)
*H04N 23/45* (2023.01)
*H04N 23/695* (2023.01)

(52) U.S. Cl.
CPC ......... *H04N 5/2621* (2013.01); *H04N 5/2628* (2013.01); *H04N 23/45* (2023.01); *H04N 23/695* (2023.01)

(58) Field of Classification Search
None
See application file for complete search history.

(56) References Cited

U.S. PATENT DOCUMENTS

| | | |
|---|---|---|
| 3,085,354 A | 4/1963 | Rasmussen et al. |
| 3,584,513 A | 6/1971 | Gates |

(Continued)

FOREIGN PATENT DOCUMENTS

| | | |
|---|---|---|
| CN | 101276415 A | 10/2008 |
| CN | 201514511 U | 6/2010 |

(Continued)

OTHER PUBLICATIONS

Itay Yedid: "The Evolution of Zoom Camera Technologies in Smartphones", Corephotonics White Paper, Aug. 1, 2017 (Aug. 1, 2017), XP055980796.

(Continued)

*Primary Examiner* — Edemio Navas, Jr.
(74) *Attorney, Agent, or Firm* — Nathan & Associates Patent Agents Ltd.; Menachem Nathan (57) ABSTRACT

Systems, imaging devices and methods for creating background blur in camera panning or motion. Using an imaging device with an image sensor, a method may comprise selecting an object to be tracked in a scene, recording an image or an image stream, and aligning the selected object optically and/or digitally to a same position on the image sensor while the selected object moves relative to the imaging device or relative to the scene, thereby creating a blurred image background and/or foreground relative to the selected object and a sense of panning or motion.

20 Claims, 6 Drawing Sheets

Related U.S. Application Data continuation of application No. 17/276,376, filed as application No. PCT/IB2020/055428 on Jun. 9, 2020, now Pat. No. 11,368,631.

(60) Provisional application No. 62/881,007, filed on Jul. 31, 2019.

(56) References Cited

U.S. PATENT DOCUMENTS

| | | |
|---|---|---|
| 3,941,001 A | 3/1976 | LaSarge |
| 4,199,785 A | 4/1980 | McCullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,320,610 B1 | 11/2001 | Gant et al. |
| 6,341,901 B1 | 1/2002 | Iwasa et al. |
| 6,520,643 B1 | 2/2003 | Holman et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,304,305 B1 | 4/2016 | Paul et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 10,327,005 B2 * | 6/2019 | Haque ............... H04N 19/45 |
| 12,069,371 B2 | 8/2024 | Shabtay et al. |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0136554 A1 | 9/2002 | Nomura et al. |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0162564 A1 | 8/2003 | Kimura et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0169772 A1 | 9/2004 | Matsui et al. |

(56) References Cited

U.S. PATENT DOCUMENTS

| | | |
|---|---|---|
| 2004/0189849 A1 | 9/2004 | Hofer et al. |
| 2004/0227838 A1 | 11/2004 | Atarashi et al. |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0035631 A1 | 2/2007 | Ueda |
| 2007/0077057 A1 | 4/2007 | Chang |
| 2007/0114990 A1 | 5/2007 | Godkin |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0190909 A1 | 7/2009 | Mise et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0295986 A1 | 12/2009 | Topliss et al. |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2011/0310219 A1 | 12/2011 | Kim et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0098927 A1 | 4/2012 | Sablak et al. |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-Lacroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0036112 A1 | 2/2014 | Scarff |
| 2014/0049615 A1 | 2/2014 | Uwagawa |
| 2014/0049656 A1* | 2/2014 | Kimoto .............. H04N 23/681 |
| | | 348/208.1 |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |

(56) References Cited

U.S. PATENT DOCUMENTS

| | | |
|---|---|---|
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0086127 A1 | 3/2015 | Camilus et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0181115 A1 | 6/2015 | Mashiah |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0288865 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0028949 A1 | 1/2016 | Lee et al. |
| 2016/0044250 A1 | 2/2016 | Shabtay et al. |
| 2016/0070088 A1 | 3/2016 | Koguchi |
| 2016/0073018 A1* | 3/2016 | Ikeda .................. H04N 23/63 |
| | | 348/207.11 |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0245669 A1 | 8/2016 | Nomura |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0094187 A1 | 3/2017 | Sharma et al. |
| 2017/0115466 A1 | 4/2017 | Murakami et al. |
| 2017/0124987 A1 | 5/2017 | Kim et al. |
| 2017/0150061 A1 | 5/2017 | Shabtay et al. |
| 2017/0176711 A1 | 6/2017 | Iwasaki et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0230552 A1 | 8/2017 | Eromaki et al. |
| 2017/0242225 A1 | 8/2017 | Fiske |
| 2017/0276954 A1 | 9/2017 | Bajorins et al. |
| 2017/0289458 A1 | 10/2017 | Song et al. |
| 2017/0293999 A1* | 10/2017 | Tokui .................. H04N 23/682 |
| 2017/0294002 A1 | 10/2017 | Jia et al. |
| 2017/0329111 A1 | 11/2017 | Hu et al. |
| 2018/0003925 A1 | 1/2018 | Shmunk |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0183982 A1 | 6/2018 | Lee et al. |
| 2018/0184010 A1 | 6/2018 | Cohen et al. |
| 2018/0198897 A1 | 7/2018 | Tang et al. |
| 2018/0216925 A1 | 8/2018 | Yasuda et al. |
| 2018/0241922 A1 | 8/2018 | Baldwin et al. |
| 2018/0249090 A1 | 8/2018 | Nakagawa et al. |
| 2018/0295292 A1 | 10/2018 | Lee et al. |
| 2018/0300901 A1 | 10/2018 | Wakai et al. |
| 2018/0307005 A1 | 10/2018 | Price et al. |
| 2018/0329281 A1 | 11/2018 | Ye |
| 2018/0368656 A1 | 12/2018 | Austin et al. |
| 2019/0089941 A1 | 3/2019 | Bigioi et al. |
| 2019/0096047 A1 | 3/2019 | Ogasawara |
| 2019/0100156 A1 | 4/2019 | Chung et al. |
| 2019/0121103 A1 | 4/2019 | Bachar et al. |
| 2019/0121216 A1 | 4/2019 | Shabtay et al. |
| 2019/0130822 A1 | 5/2019 | Jung et al. |
| 2019/0154466 A1 | 5/2019 | Fletcher |
| 2019/0213712 A1* | 7/2019 | Shoa Hassani Lashdan ............... |
| | | G06T 5/70 |
| 2019/0215440 A1 | 7/2019 | Rivard et al. |
| 2019/0222758 A1 | 7/2019 | Goldenberg et al. |
| 2019/0227338 A1 | 7/2019 | Bachar et al. |
| 2019/0228562 A1 | 7/2019 | Song |
| 2019/0297238 A1 | 9/2019 | Klosterman |
| 2019/0320119 A1 | 10/2019 | Miyoshi |
| 2019/0378334 A1* | 12/2019 | Simpkinson ........... G06V 20/20 |
| 2020/0014912 A1 | 1/2020 | Kytsun et al. |
| 2020/0043184 A1* | 2/2020 | Zhang .................... G06T 7/70 |
| 2020/0074657 A1* | 3/2020 | Zhou ..................... G06T 5/40 |
| 2020/0092486 A1 | 3/2020 | Guo et al. |
| 2020/0103726 A1 | 4/2020 | Shabtay et al. |
| 2020/0104034 A1 | 4/2020 | Lee et al. |
| 2020/0118287 A1 | 4/2020 | Hsieh et al. |
| 2020/0134848 A1 | 4/2020 | El-Khamy et al. |
| 2020/0162682 A1 | 5/2020 | Cheng et al. |
| 2020/0220956 A1 | 7/2020 | Fujisaki et al. |
| 2020/0221026 A1 | 7/2020 | Fridman et al. |
| 2020/0264403 A1 | 8/2020 | Bachar et al. |
| 2020/0314224 A1 | 10/2020 | Yang |
| 2020/0351543 A1* | 11/2020 | Kerofsky ......... H04N 21/44008 |
| 2020/0389580 A1 | 12/2020 | Kodama et al. |
| 2021/0180989 A1 | 6/2021 | Fukumura et al. |
| 2021/0208415 A1 | 7/2021 | Goldenberg et al. |
| 2021/0333521 A9 | 10/2021 | Yedid et al. |
| 2021/0368104 A1 | 11/2021 | Bian et al. |
| 2022/0146910 A1 | 5/2022 | Li et al. |
| 2022/0252963 A1 | 8/2022 | Shabtay et al. |
| 2022/0368814 A1 | 11/2022 | Topliss et al. |
| 2023/0022701 A1 | 1/2023 | Li et al. |

FOREIGN PATENT DOCUMENTS

| | | |
|---|---|---|
| CN | 102130567 A | 7/2011 |
| CN | 102215373 A | 10/2011 |
| CN | 102739949 A | 10/2012 |
| CN | 102982518 A | 3/2013 |
| CN | 103024272 A | 4/2013 |
| CN | 203406908 U | 1/2014 |
| CN | 203482298 U | 3/2014 |
| CN | 103841404 A | 6/2014 |
| CN | 204422947 U | 6/2015 |
| CN | 205301703 U | 6/2016 |
| CN | 105827903 A | 8/2016 |
| CN | 105847662 A | 8/2016 |
| CN | 105872325 A | 8/2016 |
| CN | 107608052 A | 1/2018 |
| CN | 107682489 A | 2/2018 |
| CN | 109729266 A | 5/2019 |
| CN | 111988454 A | 11/2020 |
| EP | 1536633 A1 | 6/2005 |
| EP | 1780567 A1 | 5/2007 |
| EP | 2523450 A1 | 11/2012 |

(56) References Cited

FOREIGN PATENT DOCUMENTS

| | | |
|---|---|---|
| JP | S59191146 A | 10/1984 |
| JP | 04211230 A | 8/1992 |
| JP | H07318864 A | 12/1995 |
| JP | 08271976 A | 10/1996 |
| JP | H114373 A | 1/1999 |
| JP | 2002010276 A | 1/2002 |
| JP | 2003298920 A | 10/2003 |
| JP | 2003304024 A | 10/2003 |
| JP | 2004056779 A | 2/2004 |
| JP | 2004133054 A | 4/2004 |
| JP | 2004245982 A | 9/2004 |
| JP | 2005099265 A | 4/2005 |
| JP | 2005122084 A | 5/2005 |
| JP | 2005321592 A | 11/2005 |
| JP | 2006038891 A | 2/2006 |
| JP | 2006191411 A | 7/2006 |
| JP | 2006237914 A | 9/2006 |
| JP | 2006238325 A | 9/2006 |
| JP | 2008083377 A | 9/2006 |
| JP | 2007086808 A | 4/2007 |
| JP | 2007228006 A | 9/2007 |
| JP | 2007306282 A | 11/2007 |
| JP | 2008076485 A | 4/2008 |
| JP | 2008245142 A | 10/2008 |
| JP | 2008271026 A | 11/2008 |
| JP | 2010204341 A | 9/2010 |
| JP | 2011055246 A | 3/2011 |
| JP | 2011085666 A | 4/2011 |
| JP | 2011138407 A | 7/2011 |
| JP | 2011203283 A | 10/2011 |
| JP | 2012132739 A | 7/2012 |
| JP | 2013101213 A | 5/2013 |
| JP | 2013106289 A | 5/2013 |
| JP | 2016105577 A | 6/2016 |
| JP | 2017146440 A | 8/2017 |
| JP | 2018022123 A | 2/2018 |
| JP | 2019126179 A | 7/2019 |
| KR | 20070005946 A | 1/2007 |
| KR | 20090058229 A | 6/2009 |
| KR | 20100008936 A | 1/2010 |
| KR | 20110080590 A | 7/2011 |
| KR | 20110082494 A | 7/2011 |
| KR | 20130104764 A | 9/2013 |
| KR | 1020130135805 A | 11/2013 |
| KR | 20140014787 A | 2/2014 |
| KR | 101428042 B1 | 8/2014 |
| KR | 101477178 B1 | 12/2014 |
| KR | 20140144126 A | 12/2014 |
| KR | 20150118012 A | 10/2015 |
| KR | 20170105236 A | 9/2017 |
| KR | 20180120894 A | 11/2018 |
| KR | 20130085116 A | 6/2019 |
| KR | 1020200005332 A | 1/2020 |
| TW | 1407177 B | 9/2013 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

Statistical Modeling and Performance Characterization of a Real-Time Dual Camera Surveillance System, Greienhagen et al., Publisher: IEEE, 2000, 8 pages.
A 3MPixel Multi-Aperture Image Sensor with 0.7um Pixels in 0.11μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: EUROGRAPHICS, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
Zitova Bet Al: "Image Registration Methods: a Survey", Image and Vision Computing, Elsevier, Guildford, GB, vol. 21, No. 11, Oct. 1, 2003 (Oct. 1, 2003), pp. 977-1000, XP00i 189327, ISSN: 0262-8856, DOI: 10_i0i6/ S0262-8856(03)00137-9.

* cited by examiner

Low Frequency capture
FIG. 1A

High frequency capture
FIG. 1B

SYSTEM AND METHOD FOR CREATING BACKGROUND BLUR IN CAMERA PANNING OR MOTION

CROSS REFERENCE TO RELATED APPLICATIONS

This is a continuation from U.S. patent application Ser. No. 17/739,093 filed May 7, 2022 (now allowed), which was a continuation from U.S. patent application Ser. No. 17/276,376 filed Mar. 15, 2021 (now U.S. Pat. No. 11,368,631), which was a 371 application from international patent application PCT/IB2020/055428 filed Jun. 9, 2020, and is related to and claims the benefit of priority from U.S. provisional patent application No. 62/881,007 filed Jul. 31, 2019, which is incorporated herein by reference in its entirety.

FIELD

Embodiments disclosed herein relate in general to digital cameras, and in particular to effects during camera panning or motion.

BACKGROUND

Manual camera panning involves a user opening a camera shutter and tracking a moving subject (or object) during acquisition, keeping the subject or object in the same position of the frame for the duration of the exposure, before closing the shutter, to thereby acquire an image comprising a blurred background and a relatively sharp subject. The exposure time must be long enough to allow the background to blur due to the camera movement as the photographer follows the subject in the viewfinder. In the following description, "subject" and "object" may be used interchangeably.

The ability of the photographer to pan the camera to blindly track a selected object is also key to acquiring an image of the selected object in motion. A poor technique can result in blurring of both the selected object and of the background and/or foreground, due to e.g. hand motion. Thus, it can be quite difficult to acquire an image depicting a sense of motion of the selected object by manual camera panning. To aid in capturing panned pictures, photographers can use tripods and monopods or motion control camera robots, which make it easy to swing the camera in one plane, while keeping it steady in others.

It is often desirable, particularly in the field of sports photography, to capture an image depicting a sense of motion of a selected object. It is desirable to have an improved method of acquiring an image depicting a sense of motion of the selected object with a simple photographing technique that results in a smooth background/foreground blur and in a large field of view (FOV).

SUMMARY

Embodiments disclosed herein teach methods for automatically generating still images or videos with a panning effect and other blurring effects derived from camera or object motion. The methods use either a single camera or multiple cameras and output background and foreground blur according to the movement of the camera(s) or the scene.

In exemplary embodiments, there are provided methods comprising: in an imaging device that includes an image sensor, selecting an object to be tracked in a scene; recording an image or an image stream to provide a respective recorded image or recorded image stream; and aligning the selected object to a same given position on the image sensor while the selected object moves relative to the imaging device or relative to the scene, thereby creating a blurred image background and/or foreground relative to the selected object.

In an embodiment, the aligning includes aligning the selected object to a same given position on the image sensor optically.

In an embodiment, the imaging device includes a first camera having a first image sensor and a second camera having a second image sensor, wherein the recording and the aligning are performed with the first camera and wherein at least one parameter needed for the aligning is calculated using information provided by the second camera.

In an embodiment, the image sensor includes a first plurality of pixels that provide information for calculating at least one parameter needed for the aligning, and a second plurality of pixels used for the recording.

In an embodiment, the recording includes recording a plurality of frames and the aligning includes aligning the selected object optically to a similar position on the image sensor and further aligning the selected object digitally to the same given position on the image sensor.

In an embodiment, the recording includes recording a plurality of frames and the aligning includes aligning the selected object optically to discrete pixels on the image sensor and further aligning the selected object digitally to the same given position on the image sensor.

In an embodiment, the recorded image stream includes a plurality of individual images and the method further comprises generating artificial image data using individual image data.

In an embodiment, a method further comprises playing the recorded image stream with a frame per second (fps) rate different than a fps rate used for recording the image stream.

In an embodiment, the recorded image stream is divided into two or more sequences and the method further comprises playing each sequence with a different frame per second rate.

In an embodiment, a method further comprises dividing the recorded image stream into two or more sequences that exhibit a different degree of blurring.

In an embodiment, the aligning includes performing an inference for a future position of the selected object.

In an embodiment, the selected object includes a star.

In an embodiment, the at least one parameter needed for the aligning is selected from the group consisting of a shift parameter, a scale parameter and a rotation parameter.

In an embodiment, the recording includes recording a plurality of frames, and the aligning includes aligning the selected object optically to a similar position on the first image sensor and further aligning the selected object digitally to the same given position on the first image sensor.

In an embodiment, the recording includes recording a plurality of frames and the aligning includes aligning the selected object optically to discrete pixels on the first image sensor and further aligning the selected object digitally to the same given position on the first image sensor.

In an embodiment, calibration data between the first camera and the second camera is stored in a non-volatile memory.

In an embodiment, the first and second pluralities of pixels add up to a total number of sensor pixels.

In an embodiment, the at least one parameter needed for the aligning is selected from the group consisting of a shift parameter, a scale parameter and a rotation parameter.

In an embodiment, the artificial image data is used to increase uniformity in image blurring.

In exemplary embodiments, there are provided systems comprising: an imaging device that includes an image sensor for recording an image or an image stream to provide a respective recorded image or recorded image stream; and a processor configured to select an object to be tracked in a scene and to align the selected object to a same given position on the image sensor while the selected object moves relative to the imaging device or relative to the scene, thereby creating a blurred image background and/or foreground relative to the selected object.

In an embodiment, the processor configuration to align the selected object to a same given position on the image sensor includes a configuration to instruct a reflecting element to scan a field of view that includes the object.

In an embodiment, the imaging device comprises a first camera and a second camera.

In various embodiments, a system as above or below is a smartphone.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals. Elements in the drawings are not necessarily drawn to scale.

DETAILED DESCRIPTION

Figures 1A, 1B, 2A:
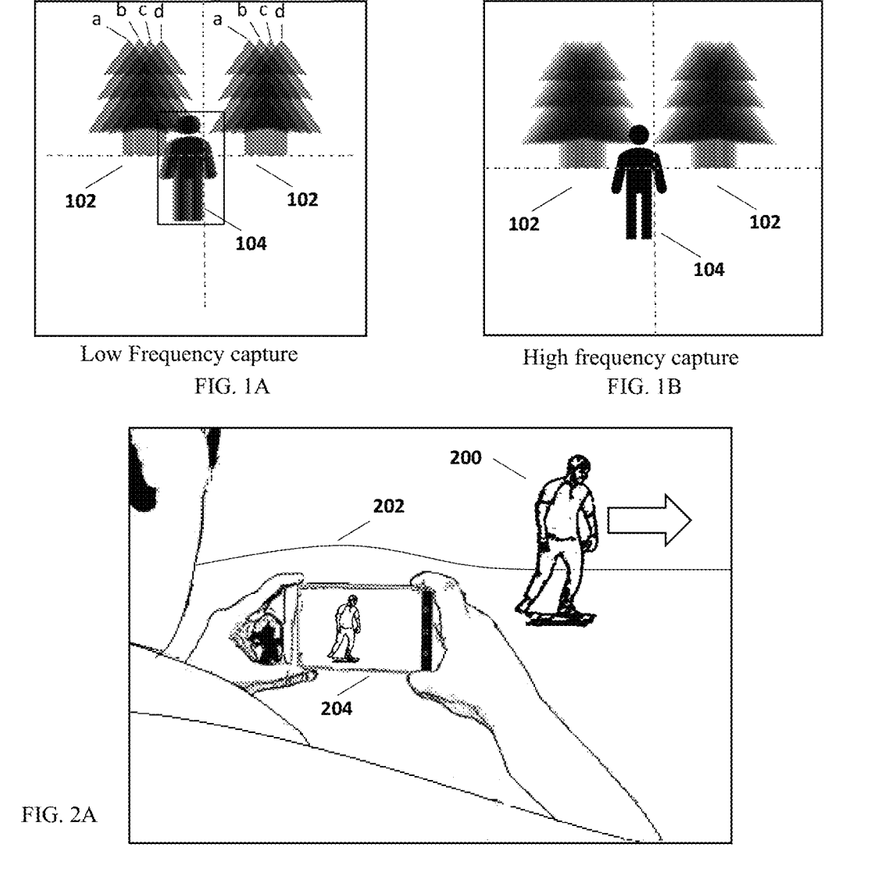
FIG. 1A illustrates phenomena with multi-frame averaging using low frequency capture.
FIG. 1B illustrates phenomena with multi-frame averaging using high frequency capture.
FIG. 2A shows an example of a dynamic scene with in which an object moves relative to a fixed (non-moving) background.

FIG. 1A shows an example of an averaged image of a dynamic scene, generated by averaging a plurality of single images that are captured at low frequency. The scene shows a background 102 comprising trees and a selected object 104. Capturing at low frequency means that a relatively large time passes between two consecutively captured images. The term "relatively large time" refers to a period of time in which significant amount of movement occurs in the scene. Capturing the single images at low frequency leads to an averaged image that has visible "steps" between features of objects. As an example we refer to the steps that are visible between the positions a-d of the respective tops of the two trees 102 in a background.

Artificial blur as known in the art may be used to modify the averaged image and to obtain a more continuous blurring of image features or regions. For example, one may use artificial blurring to obtain a degree of blurring as present for the top of the trees in FIG. 1B. In other examples a more continuous blurring may be obtained by generating artificial image data.

Referring to the image data of the left tree visible in FIG. 1A, one may e.g. use the image data from the frame that created the left top of the tree (first image data) and the image data from the frame that created the right top of the tree (second image data) to artificially generate one or more images. For example, one may apply a motion model that moves an object (here: the tree) from a first position to a second position (here: from left to right position). Image data may be artificially generated by "freezing" one or more positions generated by the motion model. The motion model may be a uniform motion along a straight line that connects an object feature (here: top of the tree) at a first position to a second position (here: from left to right position) or any other motion, e.g. a uniformly accelerated motion or a motion that is performed along an arbitrary non-straight line.

In some examples, a "degree of blurring" may be defined relatively and in respect to visual appearance only. For example, one may refer to a "stronger blurring" versus a "weaker blurring" or to a "decrease in degree of blurring" etc. when comparing two or more images that appear more blurred or less blurred to a skilled user. In some cases, a "degree of blurring" may be defined by the number of images (or "frames") that were averaged for generating an image with blurred background and/or foreground as described herein. A higher degree of blurring may correspond to a higher number of images that were averaged for image generation. In yet another example a "degree of blurring" may be defined by the number of pixels that were averaged for generating an image. A higher degree of blurring may correspond to a higher number of pixels that were averaged for image generation. For example, a low degree of blurring might be achieved if 2-3 pixels were averaged, and a high degree of blurring might be achieved if 40-50 pixels were averaged. In yet other examples a "degree of blurring" may be defined by a value that may be obtained by calculating a sum over an image-to-image deviation from the values of identical pixels for all pixels and all averaged images. A higher degree of blurring may correspond to a higher value of the sum. Functions as known in the art such as a root mean square (rms) function may be used for calculating the deviation.

FIG. 1B shows another example of an averaged image of a dynamic scene, generated by averaging a plurality of single images that are captured at high frequency. Capturing at high frequency means that a relatively short time passes between two consecutively captured images. Capturing the single images at high frequency leads to an averaged image that has almost no visible steps but a smooth transition between features of objects. In the example of the positions of the trees in background 102, we find no visible steps such as in FIG. 1A, but a smooth transition between the different positions of the trees. The smooth transition may be desired as it may be perceived as a uniform blur.

Figure 2B:
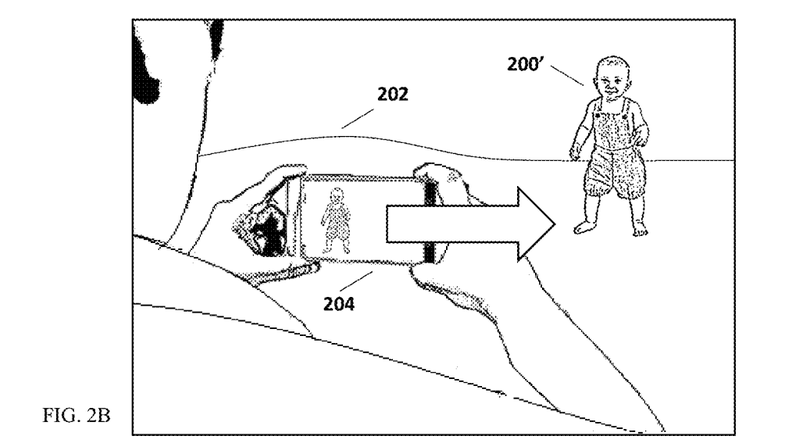
FIG. 2B shows an example of a dynamic scene in which a camera moves while photographing an object with a position fixed relative to a background.

Dynamic scenes in photography may involve either camera movements, object movements or both. FIG. 2A shows an example of a dynamic scene with in which an object 200 (e.g. a boy on a skateboard) moves relative to a fixed (non-moving) background 202. The scene is imaged (photographed) by a camera 204. Camera 204 may include a lens, an image sensor and a processing unit (processor), see also FIG. 9. FIG. 2B shows an example of another dynamic scene in which camera 204 moves while photographing a selected object (e.g. a child) 200' that has a fixed position relative to background 202. Selected object 200 and background 202 in FIG. 2A, or selected object 200' and background 202 in FIG. 2B, are at different distances from camera 204.

In photographing a dynamic scene, it is desirable to keep the object in focus while having a blurry background and/or foreground. Embodiment disclosed herein provide this in many ways, some of which are shown in FIG. 3.

Figure 3:
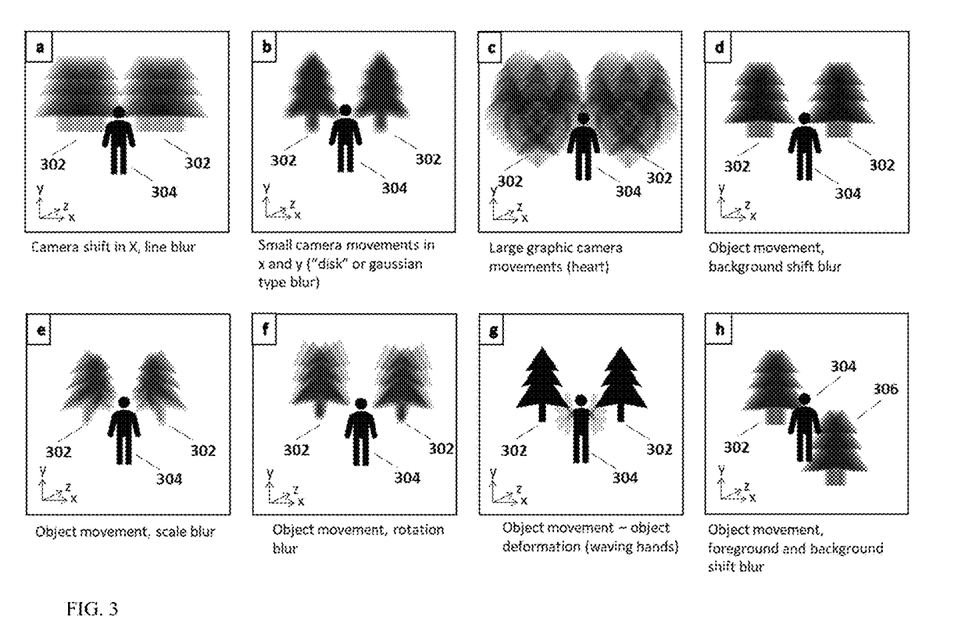
FIG. 3 shows in (a) to (g) the different types of exemplary blurring effects.

FIG. 3 shows in (a) to (g) the different types of exemplary blurring effects produced by a method disclosed herein: (a) a camera shift along the X direction in which background trees 302 behind an object (human shape) 304 exhibit a linear blur in the X direction while object 304 remains sharp; (b) small camera shifts in the X and Y directions that cause a Gaussian or "disk" type blur in trees 302; (c) large camera shifts in the X and Y directions that cause a "heart shape" type blur in trees 302; (d) movement of object 304 in the X direction relative to trees 302 causing a shift type blur (similar to the one in (a), but slightly smaller compared to the movement and independent of the distance between the object and background); (c) movement of object 304 in the Z direction relative to trees 302 causing a scale type blur; (f) rotation of object 304 relative to trees 302 causing a rotation type blur; (g) deformation movement (e.g. waving of hands) of object 304 relative to trees 302 causing a non-rigid object shape change/transformation or non-rigid object/posture change type blur; and (h) a camera shift along the X direction in which background trees 302 and foreground trees 306 behind an object (human shape) 304 show a linear blur in the X direction while object 304 remains sharp.

In some embodiments, a method described herein may not only be used for imaging a scene that one may typically refer to as a dynamic scene, but also for other purposes, for example for imaging a scene in low light conditions. "Low light" may be defined as a condition in which a scene has an average of less than 50-70 Lux, e.g. 20 Lux or 5 Lux. More generally, a method described herein may be used for capturing scenes with a long effective exposure time. A long effective exposure time may be defined by multiplication of the degree of dynamics or movement in the scene and the actual exposure time. A long effective exposure time may e.g. be obtained by an object moving fast with an angular velocity $\omega_1$ during exposure time $T_1$ as well as by an object moving more slowly with an angular velocity $\omega_2=\frac{1}{2}\cdot\omega_1$ captured with a longer exposure time $T_2=2T_1$. An example for objects moving with slow angular velocity $\omega$ that may be captured with a long exposure time T may e.g. be the stars visible in a night sky.

In some embodiments, one obtains a long effective exposure time if one or more objects in a scene or the entire scene move by a significant amount during exposure. In an example, a significant amount of movement may be defined as a movement during exposure that leads to a smearing of a specific object point over e.g. 1-3 pixels of the image sensor. In another example, a significant amount of movement may be defined as a movement during exposure that leads to a smearing of a specific object point over e.g. 10 or more pixels. In yet another example, a significant amount of movement may be defined as a movement during exposure that leads to a smearing of a specific object point over 20-250 or more pixels.

According to embodiments described next, background and foreground blur may be created intentionally and artificially through the following four scenarios, illustrated with reference to FIGS. 4-6.

Figure 4:
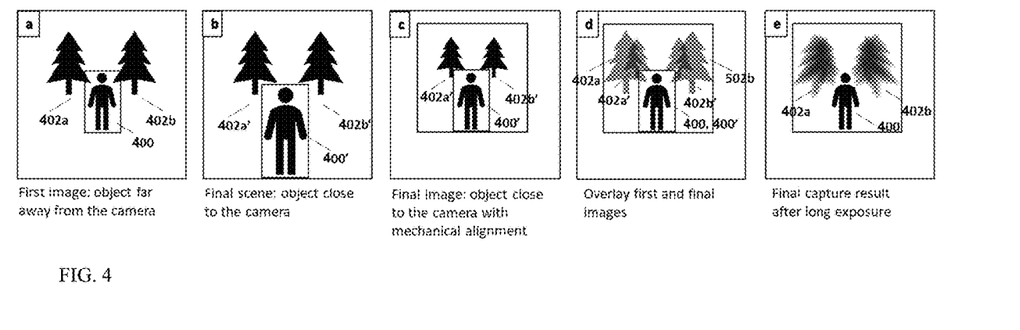
FIG. 4 shows an exemplary background blur using object movement further/closer to the camera.

In a first scenario, the selected object moves closer/further from the camera, see e.g. FIG. 4. When the object moves closer to the camera, its size becomes larger on the camera image sensor, and when the object moves away from the camera, its size becomes smaller on the camera image sensor. This represents a scale change. If the scale change of an object is not equal to the scale change of the rest of the scene, objects that are not moving in this manner will be blurred. In this scenario, the object is scaled (also referred to as "aligned") to its size on the sensor when recording starts, using mechanical zoom while capturing the image.

In more detail, frame (a) shows an image with an object (human form) 400 far away from the camera, with the background behind object 400 including two trees 402a and 402b. Object 400 is a selected object. Frame (a) corresponds to the initial scene on the sensor when image recoding begins. Frame (b) shows an image with an object 400' (representing object 400 now at a different location and time) closer to the camera in case no alignment was used. As in FIG. 4, in the following FIGS. 5 and 6 numerals 500 and 600 represent an originally selected object while numerals 500' and 600' represent the same respective object at a different location and time. Frame (c) shows scene (b) optically and/or digitally aligned (scaled) to its size on the sensor when recording started, see step 708 below, so that the object is of the same size and at the same location as in frame (a). Note that the movement decreased the size of trees 402a' and 402b' relative to the size of object 400' compared to frame (a). Frame (c) corresponds to the final scene on the sensor when finishing recording the image. Frame (d) shows overlaid images of object 400 and trees 402a and 402b from frames (a) and (c) from a start step 704 (frame a) and an end step 710 (frame c) of the capture. Frame (c) shows the final capture result, which includes the light captured on the sensor during recording (steps 704-708). This includes the first scene (a), the last scene (c) and all the scenes in between.

In some embodiments and optionally, the alignment may be performed digitally after capture. In yet other embodiments e.g. in a multi-frame case (see step 708 below) and optionally, part of the alignment may be performed optically and/or digitally during capture and part digitally after capture. For example, the aligning may include aligning the selected object optically to discrete pixels on the image sensor and further aligning the selected object digitally to the same given position on the image sensor. Aligning the selected object optically to discrete pixels may refer to an optical alignment that does not include sub-pixel alignment.

Figure 5:
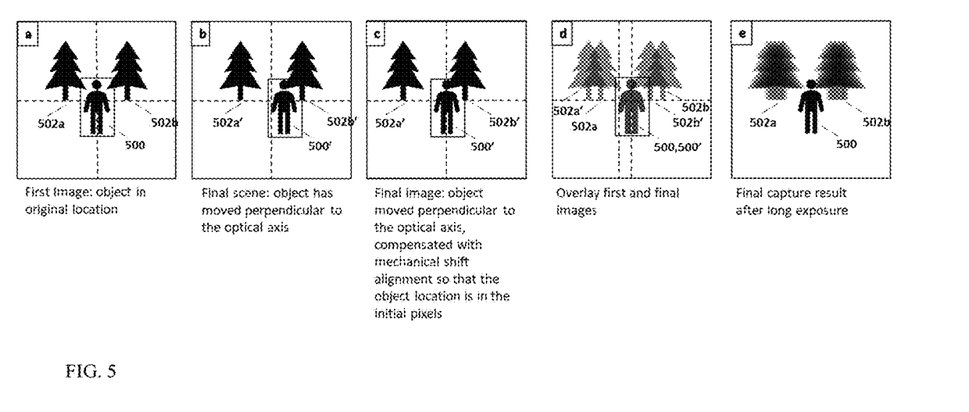
FIG. 5 shows an exemplary background using object movement perpendicular to the optical axis of the camera.

In a second scenario, the camera is still, and the selected object moves (shifts) perpendicular to the optical axis of the camera lens, see e.g. FIG. 5. If the shift movement of the selected object is not equal to the shift movement of the rest of the scene on the camera sensor, objects that do not move in this manner will be blurred. In this scenario, the selected object is aligned to its location on the sensor when the recording starts. The selected object is aligned (shifted)

while capturing the image using a mechanical shift. The mechanical shift may e.g. be performed by moving a reflecting element or an optical path folding element (OPFE) such as a prism, or by moving a camera's lens or by moving the lateral position or the tilt angle position of a camera module.

FIG. 5 describes the result of background blur obtained according to an embodiment of a method described herein for the case in which a selected object moves perpendicular to the optical axis of the camera lens. In more detail, frame (a) shows an image with a selected object (human form) 500 with the background behind object 500 including two trees 502a and 502b. Frame (a) corresponds to the initial scene on the sensor when beginning to record the image. Frame (b) shows an image with an object 500' representing object 500 that has moved right compared to the camera, in case no alignment is used. Frame (c) shows scene (b) optically and/or digitally aligned (shifted) by moving the field of view (FOV) to align object 500' see step 708 below, so that object 500' is at the same location as object 500 in frame (a). Note that the shift moved trees 502a' and 502b' to the left on the sensor. Frame (c) corresponds to the final scene on the sensor when image recording ends. Frame (d) shows overlaid images of object 500 and trees 502a and 502b from frames (a) and (c) from a start step 704 (frame a) and an end step 710 (frame c) of the capture. Frame (c) shows the final capture result, which includes the light captured on the sensor during the recording (steps 704-708). This includes the first scene (a), the last scene (c) and all the scenes in between.

In a third scenario, the camera moves perpendicular to the optical axis while the object and background/foreground do not move. This causes the distance between the object and camera to change, see e.g. FIG. 6. All objects in the scene that are at a different distance to the camera than a selected object will be blurred, due to the disparity between the baselines of the camera locations throughout the movement. If the distance between the selected object and the camera is not equal to the distance of other objects or the rest of the scene relative to the camera sensor, they will shift differently on the sensor. Objects that do not move in the same manner will be blurred. In this scenario, the selected object is aligned (shifted) using mechanical shift as described above while capturing the image.

Figure 6:
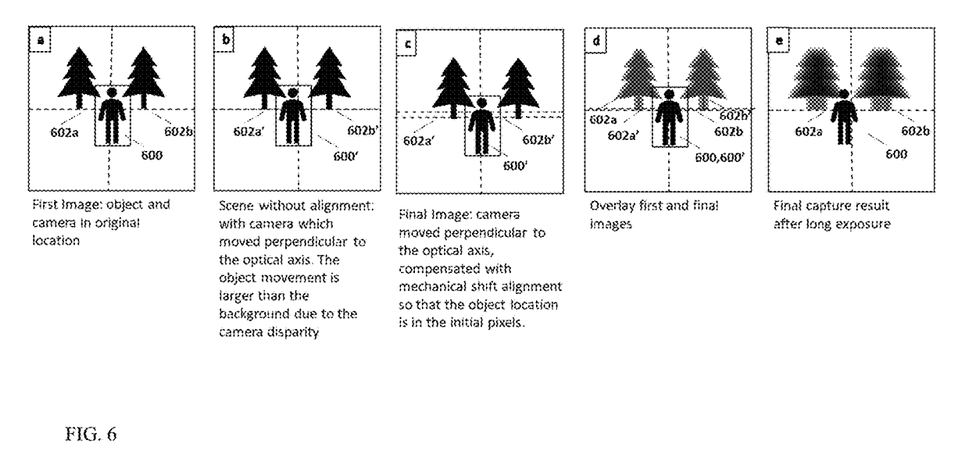
FIG. 6 shows an exemplary background blur using camera motion perpendicular to the optical axis of the camera.

FIG. 6 describes the result of background blur obtained according to an embodiment of a method described herein for the case in which the camera moves perpendicular to the optical axis of the camera. In more detail, frame (a) shows an image with an object (human form) 600 with the background behind object 600 including two trees 602a and 602b. An object 600' represents a shifted object 600. Frame (a) corresponds to the initial scene on the sensor when image recording begins. Frame (b) displays an image that moved right compared to the location in frame (a) as a result of camera movement, in case no alignment was used. Frame (c) shows scene (b) optically and/or digitally aligned (shifted) by moving the FOV to align object 600' so that the selected object is at the same location as in frame (a). Note that the shift moved trees 602a' and 602b' to the left on the sensor. Frame (c) corresponds to the final scene on the sensor when finishing recording the image. Frame (d) shows overlaid images of object 600 and trees 602a and 602b from frames (a) and (c) from a start step 704 (frame a) and an end step 710 (frame c) of the capture. Frame (c) shows the final capture result, which includes the light captured on the sensor during recording (steps 704-708). This includes the first scene (a), the last scene (c) and all the scenes in between.

In a fourth scenario, one can use any combination of the first, second and third scenarios above.

Figure 7:
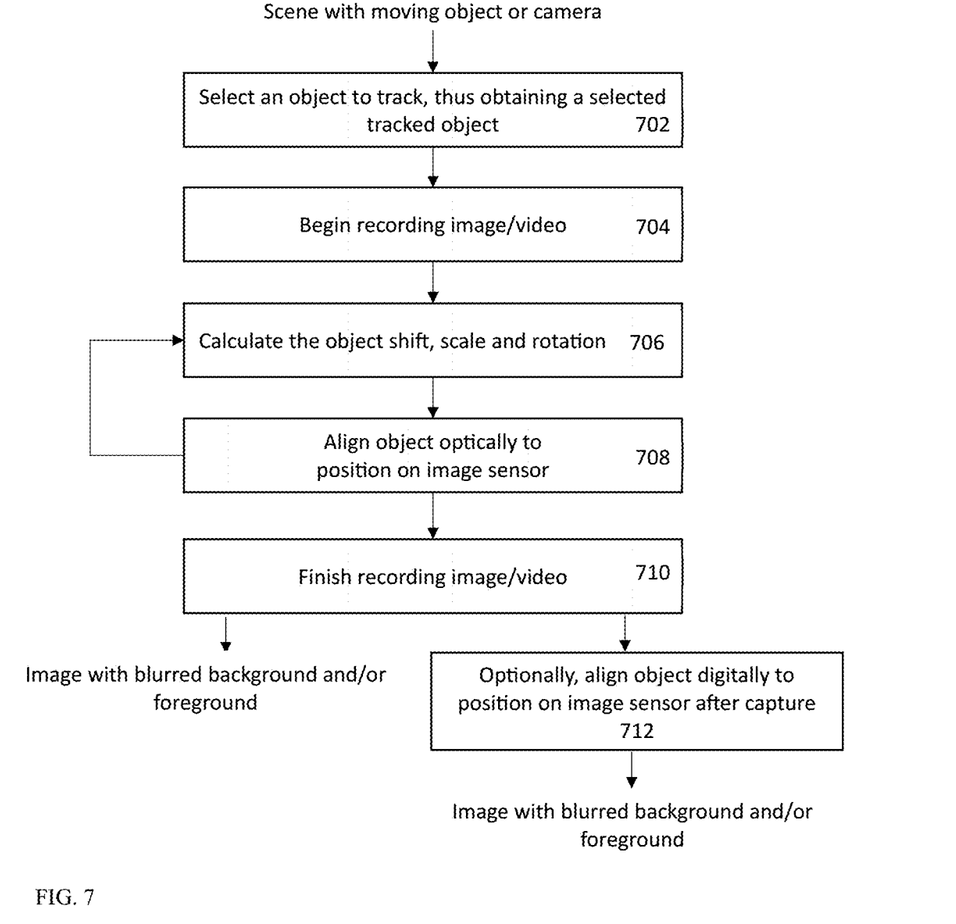
FIG. 7 illustrates in a flow chart an exemplary embodiment of a method for acquiring an image depicting a sense of motion of the object disclosed herein.

FIG. 7 illustrates in a flow chart an exemplary embodiment of a method for acquiring an image depicting a sense of motion of an object disclosed herein. The flow starts with observing a scene comprising motion induced by movement of an object or movement of the camera. An object to be tracked is selected in step 702 and recording of an image or a video stream during which the object is tracked, and with a moving object or moving the camera, starts in step 704. Shift, scale and rotation calculations are performed for an object seen in the image or in the video stream in step 706. As indicated by the arrow from 708 to 706, the tracking, scale, shift and rotation modifications are recalculated in each frame (or every X set frames). In step 708, in some embodiments, the object is aligned optically and/or digitally to ensure that it remains in the same position on the image sensor of the camera. In some embodiments involving multi-frames, the remainder of the alignment of the object may be performed digitally after recording ends, in step 712, or by a combination of mechanical and digital alignments. In some embodiments for generating a video comprising a stream of images, alignment of an object may be performed such that an object appears at the same position within the FOV of all images of the stream.

In other embodiments for generating a video comprising a stream of images, alignment of an object may be performed such that an object appears to move with an angular velocity ω that corresponds approximately to the angular velocity that the object would have moved within the scene in case that no optical alignment would have been performed in step 708. In some embodiments, a generated image stream may be played at a speed (defined by the frames per second (fps) used for the video) that was used for capturing the video. In other embodiments, a generated image stream may be played with a higher fps for achieving an artistic time-lapse effect or with a lower fps for achieving an artistic slow-motion effect. The fps may not be constant but may be modified throughout the generated video. This may be beneficial for highlighting specific segments within a FOV or for highlighting specific events that may have been occurred during video capture.

In an example, one may highlight a specific event in the video by the following or a similar sequence:

Playing a first sequence of a video with a constant fps, e.g. with the fps the video was recorded, Playing a second sequence of the video with a gradually decreasing fps till the event that is to be highlighted occurs, Playing a third sequence of the video with a constant fps after the highlighted event occurred, Playing a fourth sequence of the video with a gradually increasing fps after the event occurred and till the fps of the first sequence is reached, Playing a fifth sequence of a video with the constant fps of the first sequence.

The recording of the image or the video stream is finished in step 710, resulting in an image with a blurred background.

In some examples, the object may have been a moving object. This implies that for generating the resulting image, it is not possible to use the entire image data present in each frame, but that only image data from image segments that are present in each image of the image sequence may be usable.

More details of some of the steps performed in FIG. 7 are described below.

Object/Subject Selection Step 702

The selection of the object or subject to be tracked may be done in several ways. The selected object may be identified by a rectangular region of interest (ROI) or by a masked region inside the image. The marking of identification may be done using automatic selection, user selection, or user selection and digital refinement, all of which are known in the art. Tracking methods with improved robustness as known in the art may be used. The tracking methods may rely not only on single object features, but on a plurality of an object's features.

Recording of Image or a Video Stream, Steps 704-710

Figure 8A:
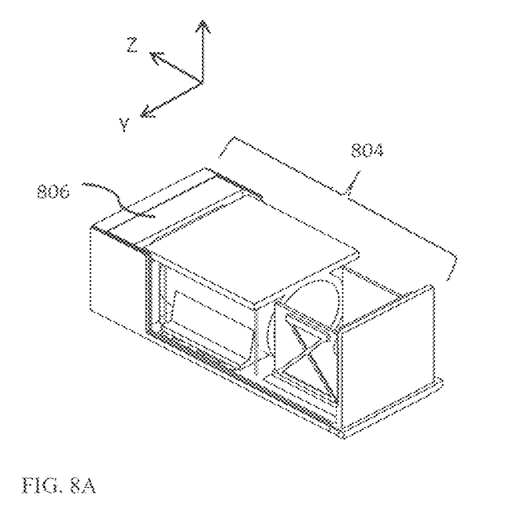
FIG. 8A shows schematically an embodiment of a dual-aperture digital camera with an adjustable Tele field of view.

The recording may be performed using a single long exposure, or by capturing a sequence of short exposure images and averaging them, as follows:

a) Single long exposure, using a long-duration shutter speed. The aperture and digital/analog gain are adjusted automatically to achieve the same brightness level.

b) Multiple images with short exposure and averaging. The exposure time can be short, since the noise will be reduced when averaging many images. For video mode, the output may be averaging the last frames taken, for example the average of the last 10-30 frames.

c) Using a single camera (for example folded camera 804, shown also in FIG. 8A) with different sensor pixel functionality, i.e. some (a plurality) of the sensor pixels experience short multi-exposures while other sensor pixels experience long exposures. For example, by using a Quad sensor (see e.g. Japan patent application No. 2019041178), the quad-Bayer pixel structure enables having two exposures within a group of four pixels. In this case, a selection of the pixels on the image sensor are used for a long exposure and the remaining pixels are used for a short exposure. The final image is a combination of image data from the long and short exposure pixels.

In some embodiments, a single image may be generated and output for displaying to a user. In other embodiments, a stream of images (i.e. a video) may be generated for output. In case a video stream is generated, specific degrees of blur may be desired for specific sequences of the video. This may be achieved by adapting the number of the frames taken for averaging (or averaging). In an example, for a first sequence having a first degree of blurring 10-30 frames may be averaged, while for a second sequence having a second degree of blurring 30-60 frames may be averaged. The second sequence of the generated video has a higher degree of blurring than the first sequence. In another example, 5-10 frames may be averaged to obtain a third sequence exhibiting a weaker blurring than the first and the second sequence. A user or a program may define the degree of blurring in "post capture", i.e. at an arbitrary time after the image stream was captured. In yet another example, for the sake of highlighting a specific event in the scene, it may be desired to gradually increase the degree of blurring till the event occurs, keeping a constant degree of blurring during the event, and then gradually decrease the degree of blurring. As the blurring relies on averaging the image data present in different frames, the degree of blurring cannot be modified continuously but only in discrete steps. In some examples, the discrete steps are performed by adding or subtracting one or more frames to the sequence or set of frames that are averaged. For achieving a continuous blur modification an artificial blur as known in the art may be superposed on the blur achieved by image averaging. Artificial blur as known in the art may also be used to modify the degree of blur continuously within a single image generated as described herein.

Calculating Shift, Scale and Rotation Step 706

In exemplary embodiments, the object may be tracked in one of the ways outlined below, using for example known cameras described in co-owned international patent applications PCT/IB2016/052179, PCT/IB2016/055308. PCT/IB2016/057366, and PCT/IB2019/053315, and the shift, scale and rotation may be calculated from the result of the tracking.

1. Using a single camera (for example folded camera 804, shown also in FIG. 8A) with different sensor pixel functionality, i.e. some (a plurality) of the sensor pixels experience short multi-exposures while other sensor pixels experience long exposures. The object shift, scale and rotation calculations are performed using information from some (a plurality) of the pixels on sensor 806, for example $\frac{1}{16}$ of the total number of pixels. The mechanical alignment is performed on camera 804. Picture recording steps 704-710 are performed on the remaining pixels (i.e. the $\frac{15}{16}$ of the total number of pixels not used in the object shift, scale and rotation calculations) of sensor 806.

Figure 8B:
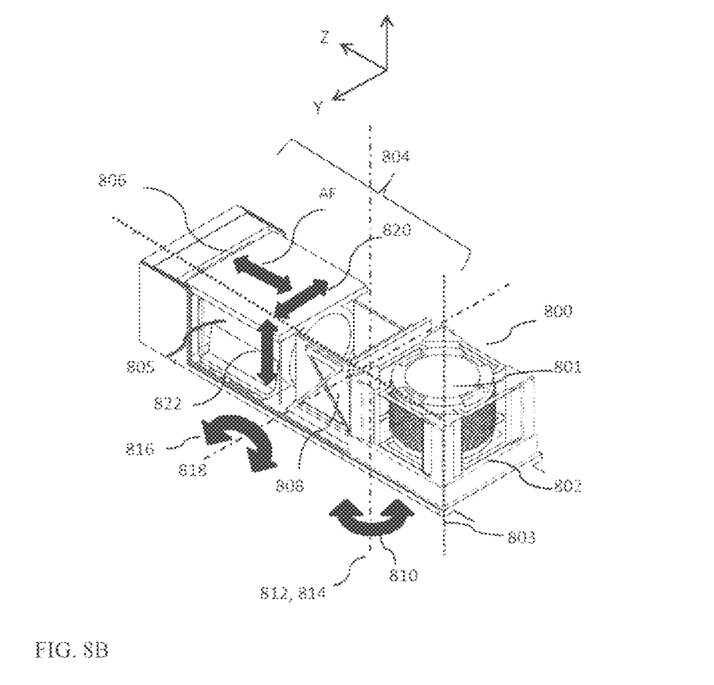
FIG. 8B shows schematically a single aperture folded digital camera with an adjustable field of view.

2. Alternatively using a single camera, the object shift calculation and picture recording are performed on the same camera sensor (e.g. sensor 806) as seen in FIG. 8B. The object is tracked on the video stream and the shift, scale and rotation are calculated. The mechanical alignment is performed while tracking (step 708).

3. Using a dual-camera described for example in PCT/IB2016/057366 and shown in FIG. 8B and FIG. 9: The dual-camera comprises a first upright camera 800 with a lens 801, a sensor 802 and an optical lens axis 803, and a second folded camera 804 with a lens 805, a sensor 806 and an OPFE 808 (e.g. a prism). Camera 800 can be IR, visible light, structured light or any other type of light and is used for object tracking. The mechanical alignment and picture recording are performed on camera 804. The object position (shift, scale and rotation) calculation is performed by tracking the object using information from sensor 802. To estimate the alignment needed on camera 804 (for step 708), the shift, scale and rotation between the sensors is calculated using feature matching and previous calibration between the cameras. Cameras such as camera 804 (see FIG. 8A) and the dual camera comprising camera 800 and camera 804 (see FIG. 8B) may be included in a host device such as electronic device 900.

In some embodiments, an inference (estimation) of a future position of the moving object may be performed. The inference may be based on parameters such as past shifts, scales and rotations detected in captured frames. These can provide an estimate of future shift, scale and rotation. The estimate may be performed for example by linear extrapolation of past shifts, scales and rotations. In another embodiment non-linear extrapolation may be performed. The inference may also or alternatively be based on machine learning or other techniques known in the art. The inference may be beneficial for performing meaningful mechanical alignment in step 708. As an example, one may consider an object moving at an angular velocity $\omega_{Object}$ within the FOV of a scene that may be smaller but still in the order of the maximum angular velocity $\omega_{Scan}$ with which a FOV scan movement (that may be required for performing mechanical alignment) can be performed, e.g. by rotating an OPFE. In this example, the inference may be crucial for performing mechanical movement that can indeed align the object at a specific position on the image sensor. In some embodiments, one may extrapolate on a time scale required for capturing e.g. 2-4 frames. In other embodiments, e.g. embodiments that require larger strokes of mechanical alignment, one may extrapolate on a time scale required for capturing e.g. 4-10 frames or more.

In some embodiments, digital alignment may be performed in order to compensate for deviations between the actual movement that was captured and the extrapolated movement.

Other embodiments may use other single, dual or multi-aperture cameras to perform object tracking, picture recording or both.

Mechanical Alignment Step 708

In exemplary embodiments, the alignment of the object, shift, rotation and zoom on the sensor can be performed optically and/or digitally (the latter is using a digital video stream). The following types of mechanical alignment can be used:

Prism movement to match object shift, for example in a dual camera shown in FIG. 8B and described in PCT/IB2019/053315. OPFE 808 may fold the optical path around two axes (each axis being a degree of freedom, DOF). The degrees of freedom are a yaw rotation 810 around yaw rotation axis 812 which is parallel to first optical path 814 (X axis), and a pitch rotation 816 around a pitch rotation axis 818 which is parallel to the Y axis. The FOV scanning by prism movement is not performed instantaneously but requires some settling time. FOV scanning by prism movement may be performed on a time scale of about 1-30 ms for scanning e.g. 2°-5° and about 15-80 ms for scanning 10-25°.

1. Lens movement or camera module movement to modify the camera's lateral position or tilt angle to match object shift, the movements described for example in PCT/IB2016/052179. For example, the movements of the lens module may be performed using actuators in X direction 822, which correspond to a shift of the object in the Z direction, and Y directions 820. The tilt motion is convertible into a linear displacement along an optical axis of an optical element coupled to the actuator. Two actuators can be combined into an assembly capable of providing double-axis tilt, for example as described in co-owned PCT/IB2019/053315.
2. Mechanical zoom adjustment to match object scale. Some advanced camera designs may include different groups of lenses that can move with respect to each other and hence change the effective focal length of the camera, which results in optical zoom capability. The mechanical zoom can be used to optically align the scale of the object.
3. Mechanical alignment to match object rotation. For example, an OPFE tilt-created image Roll movement compensating for the object rotation. By combining the rotation of the prism around two axes (Y—818 and X—812) and by shifting the lens in the Y direction one can achieve compensation for the tangential rotation of the object (in the Roll axis). The mechanism is described in detail in Applicant's international patent application PCT/IB2016/055308.

Note that other configurations may use alternative external or internal mechanical alignment elements using motor or motion control.

Some embodiments of the method may be configured to capture scenes with very low light such as a night sky. An embodiment for night sky capturing may resemble a so called "star tracker" tripod, i.e. a tripod that follows the movement of the stars for capturing the sky ("Astrophotography") with long exposure times. Astrophotography is typically performed under lightning conditions having about 0.1-0.0001 Lux. For Astrophotography it may be beneficial to place the camera host device at an object at rest (relative to the earth) or fixedly connect the camera host device to an object at rest. The earth performs a relative movement with respect to the stars so that for a photographer on the earth the stars may move with an angular velocity ω of about ω ≈4·10$^{-3}$ deg/s, derived from Earth's rotation of 360 deg in ~24 hours (translates to approximately 15 deg per hour or ¼ deg per minute). As known, the actual angular velocity depends on the specific location or coordinates of the photographer on the earth. In optical alignment step 708, one may perform a movement with an OPFE or a lens or a sensor or a camera that resembles the movement of the stars. In an example, the optical alignment in step 708 may depend solely on a user's location and the camera's orientation on the earth only, i.e. no further information such as image information from a camera may be required. The user's location and the camera's orientation may be acquired directly with the camera host device, as known, or indirectly, e.g. by an outside device such a WiFi supplying device whose location is known.

In general, photographers use the "600 rule" (sometimes also the "500 rule"). The 600 rule provides a rough estimate of the maximum possible exposure time $T_{Max}$ for a given camera setup that can be used for astrophotography. That is, exposing the sensor for $T_{Max}$ is expected to provide maximum signal capture while still not leading to star trails in the image. The 600 rule states that $T_{Max}$ in seconds is given by:

$$T_{Max} = \frac{600}{CF \times EFL} \qquad \text{(Equation 1)}$$

with CF being the camera sensor's crop factor and EFL being the effective focal length (in mm) as known in the art. Typically, EFLs of cameras included in mobile devices are in the range of e.g. EFL=2.5 mm (for Ultra-Wide cameras) to EFL=25 mm (for Tele cameras). Typically, CFs of cameras included in mobile devices are in the range of e.g. CF=2.5 (for large ⅟₁" sensors) to CF=10 (for ¼" sensors). Considering the extreme cases of (a) CF=2.5 and EFL=2.5 mm (large sensor and large FOV) and (b) CF=10 and EFL=25 mm (small sensor and narrow FOV) as examples, one obtains $T_{Max}$ values in the context of mobile astrophotography of $T^1_{Max}$≈100 s and $T^2_{Max}$≈2.4 s. The second example (CF=10, EFL=25 mm) may e.g. correspond to a folded Tele camera with high zoom factor. With a method described herein and applied in the astrophotography context for compensating the motion of stars by optically aligning the stars on the image sensor, it may be possible to use significantly longer exposure times while still obtaining crisp night sky images without star trails. Significantly longer exposure times may mean here exposure times that are longer by a factor of 1.5-40 than what is estimated using the 600 rule. As apparent from the second example, this may be especially relevant for Tele cameras. In other examples, the stars may not be aligned optically but may be aligned digitally in step 712. In yet other examples, the stars may be aligned by a combination of optical and digital alignments.

Figure 9:
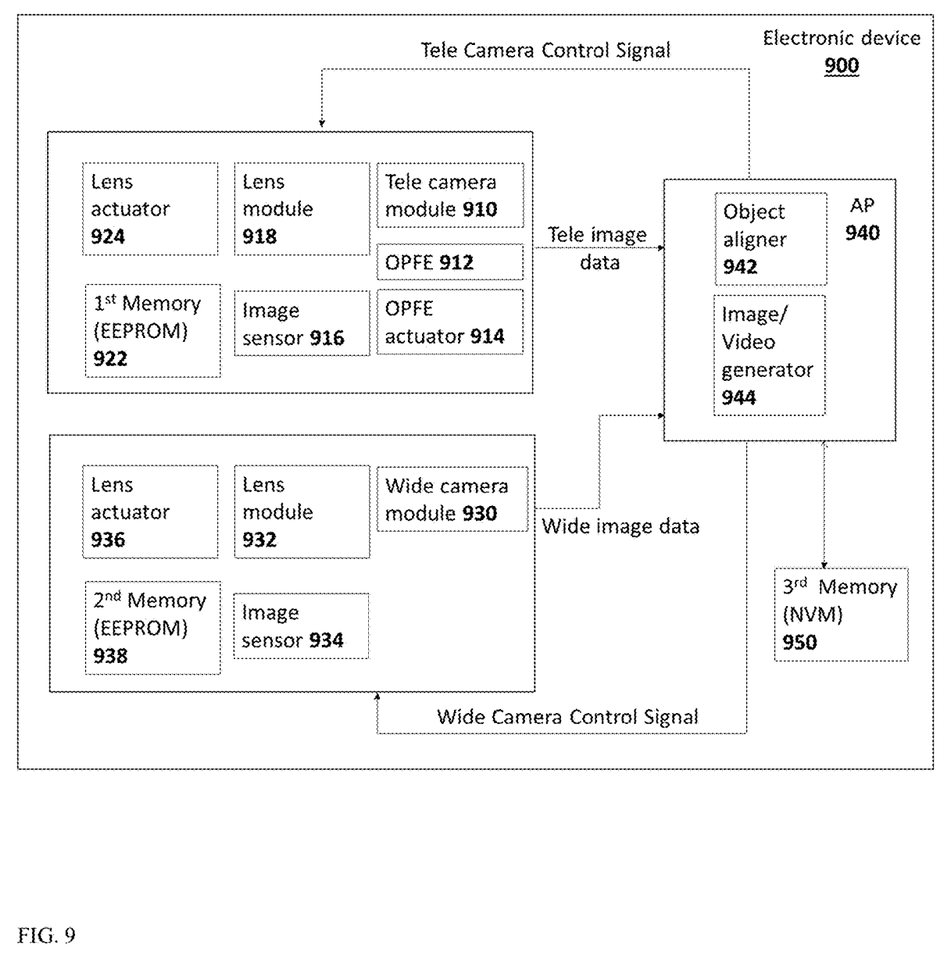
FIG. 9 shows schematically an embodiment of an electronic device that includes multi-aperture cameras with at least one scanning Tele camera.

FIG. 9 shows schematically an embodiment of an electronic device numbered 900 and including multi-aperture cameras with at least one scanning Tele camera. Electronic device 900 may e.g. be a smartphone, a tablet or a laptop. Electronic device 900 comprises a first scanning Tele camera module 910 that includes an OPFE 912 for FOV scanning, and a first lens module 918 that forms a first image recorded by a first image sensor 916. A first lens actuator 924 may move lens module 918 for focusing and/or optical image stabilization (OIS). In some embodiments, electronic device 900 may further comprise an application processor (AP) 940 that includes an object aligner 942 and an image/video generator 944. In some embodiments, first calibration data may be stored in a first memory 922 of a camera module, e.g. in an EEPROM (electrically erasable programmable read only memory). In other embodiments, first calibration data may be stored in a third memory 950 such as a NVM (non-volatile memory) of the electronic device 900. The first calibration data may comprise calibration data between sensors of a Wide camera module 930 and the Tele camera module 910. In some embodiments, second calibration data may be stored in a second memory 938. In other embodiments, the second calibration data may be stored in third memory 950. In other embodiments, AP 940 may receive calibration data stored respective in a first memory located on camera module 910 and in a second memory located in camera module 930. The second calibration data may comprise calibration data between sensors of a Wide camera module 930 and the Tele camera module 910. Electronic device 900 further comprises a Wide (or Ultra-Wide) camera module 930 with a FOV larger than FOV of camera module 910 that includes a second lens module 932 that forms an image recorded by a second image sensor 934. A second lens actuator 936 may move lens module 932 for focusing and/or OIS. In use, a processing unit such as AP 940 may receive respective first and second image data from camera modules 910 and 930 and supply camera control signals to camera modules 910 and 930. Camera control signals may include control signals to OPFE actuator 914, which may, in response to the control signals, rotate OPFE 912 for FOV scanning. The FOV scanning may be used for optically (or mechanically) aligning a selected object to a given position on the image sensor in step 708. In some embodiments, OPFE actuator 914 may actuate OPFE 912 for OIS. In some embodiments and e.g. for performing step 706, AP 940 may receive second image data from camera module 930. Object aligner 942 may be a processor configured to use the second image data for tracking the selected object and calculating control signals sent to Tele camera 910 for optically aligning the selected object to a given position on the image sensor. In other embodiments, object aligner 942 may use the first image data for tracking the selected object. In other embodiments, object aligner 942 may be configured to align an object digitally to a given position on the image sensor in step 712. In some embodiments object aligner 942 may be configured to use first image data and/or second image data for inference (estimation) of a future position of a moving object. Image or video generator 944 may be configured to generate images and image streams respectively as described in FIG. 7. In some embodiments, image/video generator 944 may be configured to average first image data from a plurality of single images. In some embodiments image/video generator 944 may be configured to generate artificial images. In some embodiments image/video generator 944 may be configured to generate images including artificial blur.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It is appreciated that certain features in this disclosure, which are, for clarity, described in the context of separate embodiments or example, may also be provided in combination in a single embodiment. Conversely, various features in this disclosure, which are, for brevity, described in the context of a single embodiment, may also be provided separately or in any suitable sub-combination or as suitable in any other described embodiment. Certain features described in the context of various embodiments are not to be considered essential features of those embodiments, unless the embodiment is inoperative without those elements.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A method, comprising:
providing an imaging device comprising a main camera, the main camera including a lens and an image sensor;
selecting an object to be tracked in a scene; and
while recording a plurality of individual images by the ng device, moving the lens for optically aligning the selected object to a same given position on the image sensor while the selected object moves relative to the imaging device or relative to the scene, and averaging image data from the plurality of individual images, thereby creating a blurred image background and/or foreground relative to the selected object.

2. The method of claim 1, wherein the imaging device further comprises a second camera, wherein the aligning is performed with the main camera, and wherein at least one parameter needed for the aligning is calculated using information provided by the second camera.

3. The method of claim 1, wherein the image sensor includes a first plurality of pixels that provide information for calculating at least one parameter needed for the aligning, and a second plurality of pixels used for recording an image or an image stream.

4. The method of claim 1, wherein the aligning includes performing an inference for a future position of the selected object.

5. The method of claim 1, wherein the selecting an object to be tracked in a scene is performed by using image data of the main camera.

6. The method of claim 1, wherein the selecting an object to be tracked in a scene is performed by a user.

7. The method of claim 1, wherein the selecting an object to be tracked in a scene is performed automatically.

8. The method of claim 2, wherein the selecting an object to be tracked in a scene is performed by using image data of the second camera.

9. The method of claim 2, wherein the aligning includes performing an inference for a future position of the selected object.

10. The method of claim 2, wherein the at least one parameter needed for the aligning is selected from the group consisting of a shift parameter, a scale parameter and a rotation parameter.

11. The method of claim 3, wherein the recording includes recording a plurality of frames and wherein the aligning includes aligning the selected object optically to a similar position on the image sensor and further aligning the selected object digitally to the same given position on the image sensor.

12. The method of claim 3, wherein the recording includes recording a plurality of frames and wherein the aligning includes aligning the selected object optically to discrete pixels on the image sensor and further aligning the selected object digitally to the same given position on the image sensor.

13. The method of claim 3, wherein the recorded image stream includes a plurality of individual images and wherein the method further comprises generating artificial image data using individual image data.

14. The method of claim 3, further comprising playing the recorded image stream with a frame per second (fps) rate different than a fps rate used for recording the image stream.

15. The method of claim 3, wherein the recorded image stream is divided into two or more sequences and wherein the method further comprises playing each sequence with a different frame per second rate.

16. The method of claim 3, further comprising dividing the recorded image stream into two or more sequences that exhibit a different degree of blurring.

17. The method of claim 13, wherein the artificial image data is used to increase uniformity in image blurring.

18. The method of claim 1, wherein the object is a star.

19. The method of claim 1, wherein the object is a person.

20. The method of claim 1, wherein the imaging device is a smartphone.

* * * * *